July 2, 1940.  J. NELSON  2,206,486
WEED GUARD
Filed Jan. 3, 1940
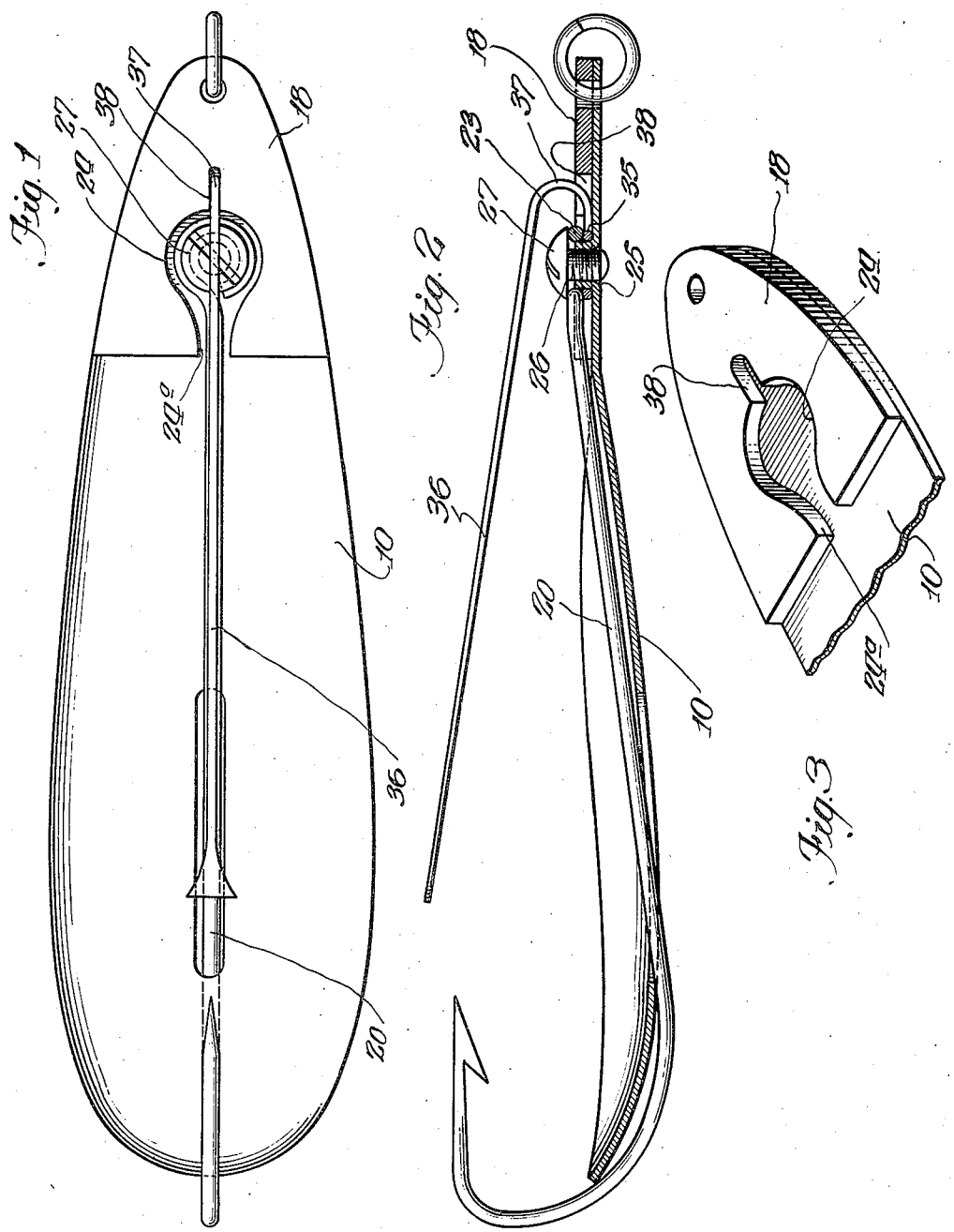
Inventor:
John Nelson
By: Miles B. Stevens & Co.
Attys.

Patented July 2, 1940

2,206,486

UNITED STATES PATENT OFFICE 2,206,486

WEED GUARD

John Nelson, Chicago, Ill.

Application January 3, 1940, Serial No. 312,277

3 Claims. (Cl. 43—39)

My invention relates to weed guards for artificial fish lures, and more particularly as applied to the type of lure covered in my pending patent application under Serial No. 283,676, filed July 10, 1939, and my main object is to provide means for attaching the weed guard securely.

Another object of the invention is to employ a balancing plate forming a part of the fish lure in my above-mentioned patent application for anchoring or locking the weed guard against lateral vibration or displacement.

An additional object of the invention is to apply the weed guard to the lure in a simple and efficient manner.

With the above objects in view and any others which may suggest themselves from the description to follow, a better understanding of the invention may be had by reference to the accompanying drawing, in which—

Fig. 1 is a top plan view of the fish lure embodying the improved weed guard;

Fig. 2 is a longitudinal section; and

Fig. 3 is a perspective view showing the formation of the balancing plate forming a part of the fish lure.

While weed guards have been applied and secured in various ways on artificial fish lures, few of these have employed positive means to lock the guard in position. Such of these as have come to my attention are involved or require special treatment of or work on the fish lure, making the same more expensive to produce. It has therefore been my intention to provide an anchor or lock for the weed guard which involves a minimum change in the lure and requires no additional parts or work to adapt the same for the improvement.

In accordance with the foregoing specific reference to the drawing denotes the lure covered in my said application at 10, the latter having a relatively thick balancing plate 18 soldered or otherwise permanently secured to it. The plate 18 is formed with an opening 24 having a constricted rear entrance at 24a.

The lure 10 is struck up with a tubular extension 25 in the center of the opening 24 around which the eye 23 of a fish hook 20 is placed, the extrusion being internally threaded to receive a screw 26 whose head 27 bears down on the eye 23 to secure the same to the lure.

As described above, the construction follows the one in my said application. However, for the purpose of the present improvement, the eye 23 of the fish hook 20 does not seat on the lure 10 to be clamped by the screw head 27, but on the eye 35 forming one end of a rearwardly directed weed guard 36. The latter takes a hook type of bend 37 in order to form the eye 35, and in order to accommodate the bend 37 the balancing plate 38 is formed with a narrow slot 38 constituting a forward extension of the opening 24. The slot 38 is only of a width to slidably receive the lower part of the bend 37, so that the weed guard becomes locked from deviation in a lateral direction.

It is apparent that the embodiment of the bend 37 in the weed guard renders the same longer and therefore more effective than one directly attached to the lure. Also, the bend is in the nature of a spring to render the guard more flexible to withstand pulling or lateral strains, which would tend to distort or break the guard if it were directly attached. Further, where a relatively light wire is necessary for a directly attached guard in order to provide some flexibility in it, a guard of a heavier and more durable gauge can be used in the improved lure by virtue of the spring bend 38.

It will be further evident that I have utilized the relatively thick and very solid balancing plate 18 of the fish lure to provide a receptacle for the weed guard bend 37 in a manner to prevent the lateral deviation or departure of the weed guard in case the screw head 27 should through vibration or other causes loosen its hold on the base of the weed guard. Further, I utilize the same extrusion 25 for securing both the base of the weed guard and that of the fish hook 20. Further, this mode of fastening and the free entrance to the slot 38 enables me to easily remove the screw 26 and take the weed guard out of the assembly in case the lure is to be used where there are no weeds, the fish hook being quickly replaceable, and the height of the extrusion 25 calculated to again permit the screw head to form a clamp for the eye 23, as in my pending application. In conclusion, it will be evident that the balancing plate may be stamped with the slot 38 during the same operation as for the opening 24, so that no additional work and no extra parts are required to embody the improvement in the fish lure.

While I have described the improvement along specific lines, various minor changes and refinements may be made without departing from its principle, and I desire to consider all such changes and refinements as coming within the scope and spirit of the appended claims.

I claim:

1. The combination with a spoon-type artificial fish lure, and a weed guard secured with one of its ends over the frontal portion of the lure; of an upward enlargement of said frontal portion forming a lock in respect to an intermediate portion of said guard to retain the latter against lateral deviation in the event that looseness develops in its fastening.

2. The combination with a spoon-type artificial fish lure, of a weed guard secured with one of its ends over the frontal portion of the lure, the weed guard having a forwardly-directed hook-shaped portion before such end, and an upward enlargement of said frontal portion forming a lock in respect to said hook-shaped portion to retain the guard against lateral deviation in the event that looseness develops in its fastening.

3. The combination with a spoon-type artificial fish lure, of a weed guard secured with one of its ends over the frontal portion of the lure, and an upwardly thickened extension of said frontal portion formed with a forward slot in its rear edge to receive said hook-shaped portion and anchor the guard against lateral deviation in the event that looseness develops in its fastening.

JOHN NELSON.